United States Patent [19]

Mercs

[11] Patent Number: 6,028,526
[45] Date of Patent: Feb. 22, 2000

[54] PROGRAM OVERTRACK CHANNEL INDICATOR FOR RECORDING DEVICES

[75] Inventor: James Mercs, Huntington Beach, Calif.

[73] Assignees: Sony Corporation, Tokyo, Japan; Sony Electronics, Inc., Park Ridge, N.J.

[21] Appl. No.: 08/936,709

[22] Filed: Sep. 24, 1997

[51] Int. Cl.[7] .............................. G08B 5/00; G11B 3/90
[52] U.S. Cl. .......................... 340/815.4; 340/815.47; 340/525; 369/1; 369/4; 369/53
[58] Field of Search ..................... 340/815.4, 815.47, 340/525, 825.16, 825.15; 369/49.53; 360/27, 78.04, 77.04, 137

[56] References Cited

U.S. PATENT DOCUMENTS

| | | | |
|---|---|---|---|
| 4,361,855 | 11/1982 | Igarashi | 360/39 |
| 4,405,962 | 9/1983 | Slakmon | 360/49 |
| 4,506,309 | 3/1985 | Joannon et al. | 360/137 |
| 4,772,962 | 9/1988 | Tanaka et al. | 360/32 |
| 5,027,230 | 6/1991 | Nakayama | 360/32 |
| 5,446,879 | 8/1995 | Yamamoto et al. | 395/180 |
| 5,654,841 | 8/1997 | Hobson et al. | 360/75 |
| 5,818,654 | 10/1998 | Reddy et al. | 360/53 |

*Primary Examiner*—Donnie L. Crosland
*Attorney, Agent, or Firm*—Blakely, Sokoloff, Taylor & Zafman LLP

[57] ABSTRACT

A method and apparatus for improving the user interface of a multi-track recording device is described. An alphanumeric track display output a network track number for each track in the multi-track recording device. A display mode switch switches the track display to output other relevant status information regarding whether a track utilizes a standard gain and whether a track is slipped.

13 Claims, 2 Drawing Sheets

PROGRAM OVERTRACK CHANNEL INDICATOR FOR RECORDING DEVICES

BACKGROUND OF THE INVENTION

(1) Field of the Invention

The present invention relates to output displays for multi-track recorders. More particularly, the application relates to a method and apparatus for indicating modes of operation of each individual track in a multi-track recording system.

(2) Related Art

Recording studios have traditionally used multi-track recording systems to record elements of a production. Each element is recorded on a corresponding track in the recording system. Each multi-track recorders typically handle eight to sixteen tracks. A single mixer may control multiple networked multi-track recorders. In sophisticated studio arrangements, a recording engineer may monitor hundreds of tracks.

In one arrangement, each track of the multi-track recording system is typically connected to one control of a mixer. Each track may be individually controlled, thus a track may have its gain independently increased or decreased. Each track may also be "slipped" relative to other tracks in the system. In such a slipped mode, the track may be displaced in time with reference to other tracks.

The number of tracks and the variety of independent controls makes it very difficult for a recording engineer to coordinate and monitor the status of each of the individual tracks. For example, it is difficult to tell when a particular track in the multi-track system is recording or playing. Each track typically has a corresponding level meter using a plurality of level lights indicating the signal strength of the information being received or output by the corresponding track. The level lights are, in one embodiment, a plurality of light emitting diodes.

Prior art multi-track recording systems typically had silk-screened recorder track numbers identifying level meters corresponding to the track. The recorder track number typically ranged from 1–16. In a networked system, each track was assigned a different network track number which often ranged from 1–99. A user manually matched mixer controls with a particular recorder track number of a multi-track recorder. The user also checked switches to determine whether a track was slipped (repositioned in time with respect to other tracks), or whether a particular track had a nonstandard gain value. Manually matching network track numbers assigned by the network and mixer to recorder track numbers silk screened on a display while monitoring the status of a large number of tracks is cumbersome. Thus, a compact method and apparatus for quickly indicating the status of a track is desirable.

BRIEF SUMMARY OF THE INVENTION

A method and apparatus of electronically displaying the status of a track is described. An electronically controlled alphanumeric readout on a multi-track recorder displays a network track number of the track. The alphanumeric display also displays a first symbol indicating when a track is slipped from a reference time and a second symbol indicating when a track has a gain different from a reference gain.

DETAILED DESCRIPTION OF THE INVENTION

Figure 1:
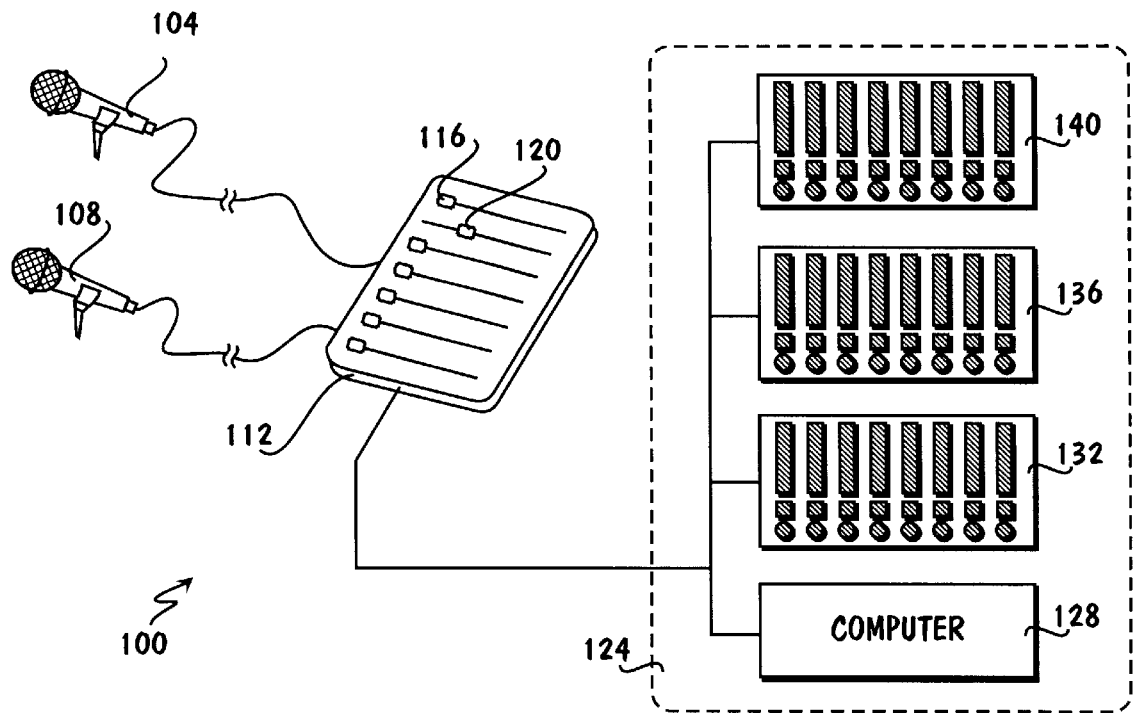
FIG. 1 is a block diagram of an overall multi-track recording system in a studio environment.

FIG. 1 illustrates an overall recording system 100 including a receiving device such as microphones 104, 108 which receive a sound signal from a source (not shown). The microphones 104, 108 transfer the signal to a mixer 112. Mixer 112 typically has a plurality of individual controls 116, 120 controlling each track in the network. A recording engineer uses each individual control 116, 120 to adjust the input gain to an individual track.

In one arrangement, the output of the mixer is transferred to a multi-track recorder. In more sophisticated set-ups, the output of the mixer 112 is transferred to a network 124. Network 124 may include a network manager such as a computer system 128 or other networking device which coordinates the flow of data from mixer 112 to a series of multi-track recording devices 132, 136, 140. Computer system 128 may include a resource manager and/or a remote client program. The network manager runs software which monitors and controls the inputs to the multi-track recording devices 132, 136, 140. In one embodiment of the invention, the network manager assigns a unique track number to each track in a multi-track recording device.

Figure 2:
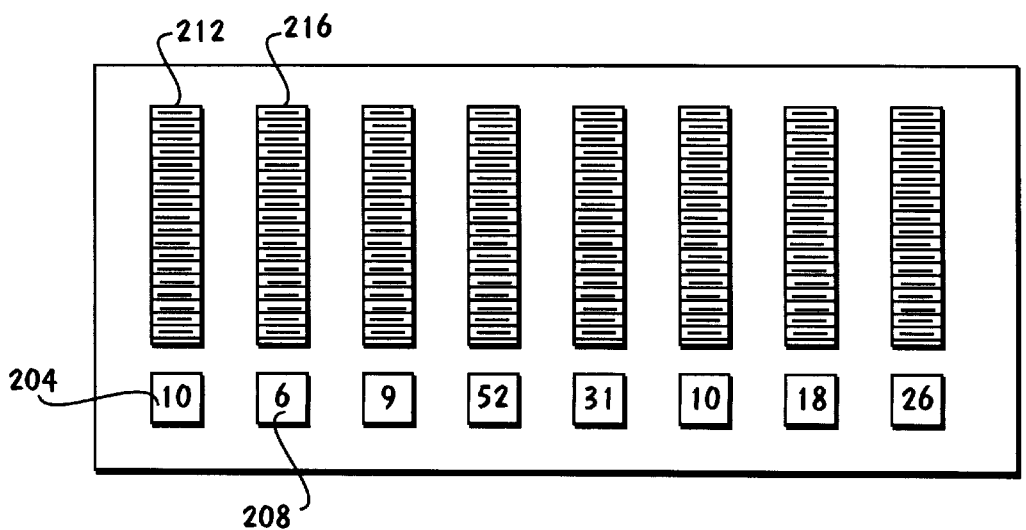
FIG. 2 is an example of a display of the multi-track recording system.

FIG. 2 illustrates one configuration of a recording display for a multi-track recorders 132, 136, 140. In the prior art, the track display 204, 208 was typically a pre-printed number on a display panel. The pre-printed numbers were not easily changeable and typically identified the recorder track number starting from a number 1 through the total number of tracks on the display of the multi-track recording device. The information displayed represented a recorder track number and is adequate for single stand alone multi-track recording devices, however, the displays do not display the network track number used for multiple networked recording devices as implemented in the system shown in FIG. 1. Level meters 212, 216 typically display the level of a signal corresponding to the track indicated in track indicator 204, 208.

In one embodiment of the invention, track displays 204, 208 are electronically adjustable. The track displays 204, 208 may be implemented as alphanumeric digital read-outs. The digital read-outs may be electronic liquid crystal displays or light emitting diodes. Each track display 204, 208 is preferably capable of outputting both numbers and letters. One advantage of using adjustable track displays 204, 208 is that in networked systems, the track display 204, 208 may output the network track number used in a networked system rather than a pre-printed recorder track number. In one embodiment, the network track number may range from one to ninety-nine. Thus a particular multi-track recorder may not have nor display a network track one. Displaying the network track number used in the system instead of a recorder track number greatly facilitates a recording engineers' monitoring of various tracks and coordinating them with the controls on the mixer. The network track numbers correspond to numbered mixer controls facilitating coordination of the mixer output.

The display of network track numbers on the multi-track recorder display is made possible by the use of identification (ID) numbers. The network manager typically assigns ID numbers on initialization or boot-up of the system or upon connection of a new multi-track recording device to the network of FIG. 1. Software in the network manager matches each track in a multi-track recording device track to a particular ID number assigned from the mixer. The network track corresponding to each ID number is displayed on the multi-track recording device.

Each track display 204, 208 may also be used in different display modes to indicate the status of a corresponding track. For example, a "slipped" condition occurs when a track is displaced in time from other tracks in the multi-track recording device. A switch may be set to place the display in a slipped condition display mode such that each track display 204, 208 outputs a symbol to indicate the slipped condition. In one embodiment, each track display 204, 208 corresponding to a slipped track displays a "S" allowing the recording engineer to quickly note which tracks in a system are slipped tracks. The indication of a slipped track in conjunction with other indications allows the recording engineer to quickly determine the status of each track. A more comprehensive display (not shown) on the multi-track recording device may display the amount of time a particular track is slipped.

Other conditions may also be displayed by the track display 204, 208. By placing the display into different display modes, the alpha-numeric on the track display can output different status information. For example, in a gain display mode, the track display 204, 208 may output a "G" in the display to indicate a nonstandard gain.

Figure 3:
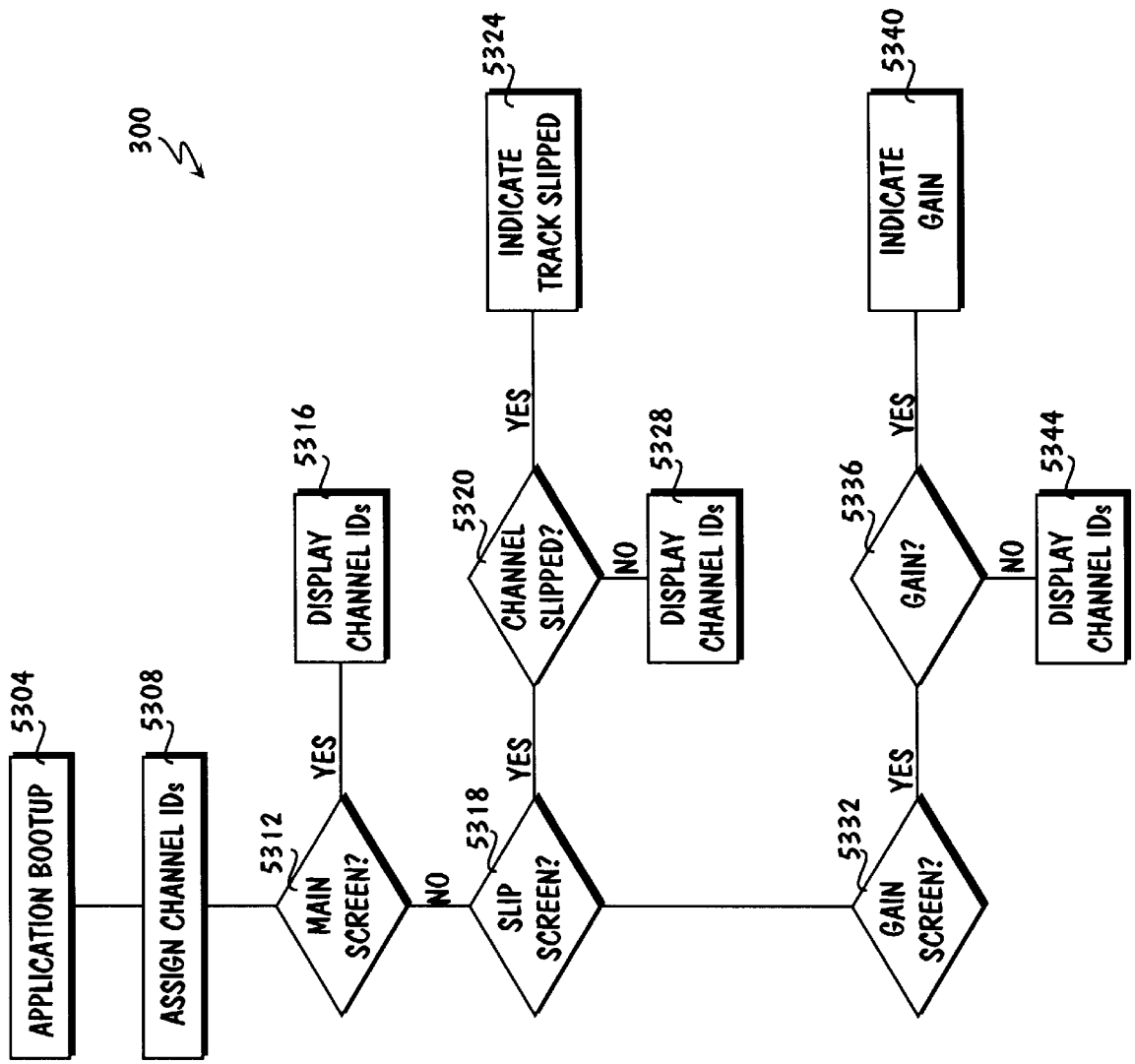
FIG. 3 is a flow diagram illustrating the steps executed by software in the present invention.

FIG. 3 displays a flow diagram of the steps used to implement the track display 204, 208. In step 304, the system is initialized and goes through a "boot up" procedure in step S304. In step S308, an ID number from a mixer or fader device is assigned by the computer or network manager to each track of a multi-track recording device coupled to the network. A display mode button or switch setting determines the display mode. In step S312, the multi-track recorder device checks the display mode switch setting to determine whether a main screen is to be displayed. If the main screen is to be displayed, the multi-track recording device displays the network track number assigned by the network manager in step S316.

The display mode button or switch may be set to display other modes. For example, in step S318, the multi-track recording device determines whether a display mode has been chosen to display slipped channels. When such a mode is selected, a processor in the multi-track recording device determines which channels have been slipped in step S320. If a particular channel has been slipped, the corresponding track display indicates that the track is slipped by displaying an appropriate alphanumeric symbol is step S324. Otherwise the track display displays the network track number in step S328.

In step S332, the multi-track recording device determines whether the display mode button or switch has been set to indicate gain status of the tracks in step S332. When displaying gain status, the multi-track recording device determines which tracks have a gain value different than a standard gain value or reference gain in step S336. In a display mode indicating gain status, when the gain of a track is different than the standard reference gain, the track display 204, 208 displays a symbol such as a letter "G" indicating that the gain is non-standard in step S340. While the system is in a display mode displaying gain status, track displays 204, 208 corresponding to tracks using the standard reference gain continue to output the track number in step 334.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A recording system comprising:

a network control system configured to identify each track on a multi-track recording system with a network track number; and a multi-track recorder configured to be coupled to a network and comprising a plurality of track displays, each track display associated with a corresponding track and configured to display a network track number for the corresponding track.

2. The recording system of claim 1 further comprising:

a display mode switch configured to be set such that each of said track displays is configured to output a symbol indicating a slipped track when the corresponding track is slipped.

3. The recording system of claim 1 further comprising:

a display mode switch configured to be set such that each track display is configured to output a symbol indicating a gain variation when the corresponding track is assigned a gain different from a reference gain.

4. The recording system of claim 1 wherein the network control system is a computer.

5. The recording system of claim 1 further comprising:

a mixer coupled to the network control system, the mixer including a plurality of controls, each control in the plurality of controls corresponding to at least one of track in the plurality of tracks.

6. The recording system of claim 1 wherein the multi-track recorder further comprises a plurality of level meters configured to output a signal received by each track, each level meter corresponding to a track display.

7. A method of indicating track status comprising the steps of:

determining a network track number for each track in a multi-track recording device coupled to a network; and displaying each network track number on a corresponding track display on a display panel of the multi-track recording device.

8. The method of claim 7 further comprising the steps of:

outputting on a series of level meters a signal strength of an input signal being received by a corresponding track.

9. The method of claim 7 further comprising the steps of:

adjusting a display mode switch to a slip display mode such that each track display corresponding to a slipped track outputs a symbol indicating a slipped track.

10. The method of claim 7 further comprising the step of:

adjusting a display mode switch to a gain display mode such that each track display corresponding to a non-standard gain outputs a symbol indicating a nonstandard gain.

11. A multi-track recording device display comprising:

a plurality of track displays, each track display configured configured to be coupled to a network and to output a network track number of a track; and a plurality of level meters coupled to the network, each level meter associated with a track and a track display, each level meter configured to generate an output indicating a signal level going to the associated track.

12. The multi-track recording device of claim 11 wherein each of the track displays is an electronically controlled alphanumeric readout device.

13. The multi-track recording device of claim 11 further comprising a display mode switch for configured to switch the plurality of track displays to output a gain status of the corresponding track.

* * * * *

UNITED STATES PATENT AND TRADEMARK OFFICE
CERTIFICATE OF CORRECTION

PATENT NO. : 6,028,526
APPLICATION NO. : 08/936709
DATED : February 22, 2000
INVENTOR(S) : Mercs It is certified that error appears in the above-identified patent and that said Letters Patent is hereby corrected as shown below:

On the title page item [73] should read as follows, insert --Sony Corporation 7-35 Kitashinagawa, 6 Chrome, Shinagawa-Ku Tokyo, Japan and Sony Pictures Entertainment, Inc. 10202 W. Washington Blvd. Culver City 90232-3195--

Signed and Sealed this

Twenty-fifth Day of December, 2007

JON W. DUDAS
*Director of the United States Patent and Trademark Office*